United States Patent [19]

Osanai

[11] Patent Number: 4,470,135
[45] Date of Patent: Sep. 4, 1984

[54] CONNECTION DEVICE WITH AUTOMATIC DISCONNECTION OF POWER SUPPLY WHEN CONNECTION MEMBERS ARE DISCONNECTED

[75] Inventor: Akira Osanai, Tokyo, Japan

[73] Assignee: Olympus Optical Co., Ltd., Tokyo, Japan

[21] Appl. No.: 349,679

[22] Filed: Feb. 17, 1982

Related U.S. Application Data

[63] Continuation of Ser. No. 138,196, Apr. 7, 1980, abandoned.

[30] Foreign Application Priority Data

Apr. 20, 1979 [JP] Japan ................................. 54-52984

[51] Int. Cl.³ .............................................. H02J 1/00
[52] U.S. Cl. ......................................... 369/11; 369/12
[58] Field of Search ...................... 369/1, 6, 7, 11, 12, 369/76; 360/137; 307/126; 364/705; 455/349, 343, 352, 77, 78, 90, 92

[56] References Cited

U.S. PATENT DOCUMENTS

| | | | |
|---|---|---|---|
| 3,484,548 | 12/1969 | Kowal et al. .......................... 369/1 |
| 3,644,684 | 2/1972 | Tsuji . | |
| 3,916,122 | 10/1975 | Sato et al. .............................. 369/7 |
| 3,934,267 | 1/1976 | Kosaka et al. ...................... 360/137 |
| 3,937,886 | 2/1976 | Saito et al. .............................. 369/1 |
| 4,032,844 | 6/1977 | Imazeki ................................. 455/77 |
| 4,041,250 | 8/1977 | Sato ..................................... 369/11 |
| 4,064,374 | 12/1977 | Sato ..................................... 369/11 |
| 4,119,813 | 10/1978 | Sato ..................................... 369/11 |
| 4,189,636 | 2/1980 | Satoh ................................... 364/705 |
| 4,199,724 | 4/1980 | Kondo ................................. 369/11 |
| 4,233,686 | 11/1980 | Sato ..................................... 369/11 |
| 4,323,787 | 4/1982 | Sato et al. ........................... 369/6 X |
| 4,369,478 | 1/1983 | Sato et al. .............................. 369/11 |

FOREIGN PATENT DOCUMENTS 2831952 1/1979 Fed. Rep. of Germany .

Primary Examiner—Donald McElheny, Jr.
Attorney, Agent, or Firm—Frishauf, Holtz, Goodman & Woodward

[57] ABSTRACT

A connection device comprises a main body (14) including a power source (12) and a first unit (10) having two terminals to which power is supplied from the power source (12); and a connection body (24) including a second unit (20) having two terminals to which power is supplied from the power source when the connection body is connected to the main body.

The connection device is characterized in that a connection means (4) includes a first connection portion (1) for connecting one terminal (a) of the first unit (10) to one terminal (c) of the second unit (20), a second connection portion (2) for connecting the other terminal (b) of the first unit (10) to the other terminal (d) of the second unit (20), and a third connection portion (3) for connecting said one terminal (c) of the second unit (20) to a terminal (f) of the power source (12), another terminal of the power source being connected to the other terminal (b) of the first unit (10) all of the connections being made when the connection body is connected to the main body.

12 Claims, 6 Drawing Figures

CONNECTION DEVICE WITH AUTOMATIC DISCONNECTION OF POWER SUPPLY WHEN CONNECTION MEMBERS ARE DISCONNECTED

This is a continuation of application Ser. No. 138,196 filed Apr. 7, 1980 now abandoned.

BACKGROUND OF THE INVENTION

This invention relates to a power-connection device which electrically couples, for example, a connection body having no power source to a system body equipped with a power source.

A tape deck device which is used, for example, in a car stereo includes a tape deck device of which a tape deck section or a tape transport section is detachably coupled with respect to the amplifying section incorporating a power source which is part of the car stereo. The tape deck section of such a system can not only be used inside a car or automobile, but can also be brought into a home to use inside the home. This may be a great feature of a plug-in type tape deck device. Such deck section, however, is usually not provided with a power source but is designed to be supplied with power solely from the body proper into which the tape deck section is to be plugged.

A representative example of the above-mentioned to-be-coupled type deck device is described in detail in Japanese patent application No. 72604/78 as filed by the assignee (Olympus Optical Co.) of this application. The Japanese patent application corresponds to U.S. application Ser. No. 46,960, filed June 8, 1979, now U.S. Pat. No. 4,369,478.

Conventionally, a two-terminal connection means was used as a means for electrically connecting a connection portion of the tape deck section to the amplifying section which includes a power source. Such two-terminal connection means is designed to connect, by its two-contact connector, a connection portion of the deck section to the power source portion of the amplifying section body in a manner that the two contacts are connected to positive and negative-polarity terminals of said power source portion, respectively. In such two-terminal connection means, however, upon having disconnected the deck section from the amplifying section body, one often forgets to turn off the power source switch of amplifying section. In order to solve the problem, it has been contemplated to provide on the amplifying section body a switch which turns the power on only at the time when the deck section is kept connected to that body. The provision of such switch results in an increase in the cost of the associated parts and also in the number of the process steps for manufacturing said amplifying section body.

SUMMARY OF THE INVENTION

The invention has been accomplished in view of the above-mentioned circumstances and is intended to provide a power-connection device which, at the time of disconnecting the connection portion from the amplifying section body having a power source, can automatically operate to turn the power source off without providing a separate switch.

The above object has been achieved by a connected device which comprises a main body including a first unit, a connection body connected to the main body and including a second unit, and a connection means which includes a first connection portion for connecting one end of the first unit to one end of the second unit, a second connection portion for connecting the other end of the first unit to the other end of the second unit, and a third connection portion for connecting said other end of the first unit to said one end of the second unit.

The object can be achieved by, in the connection device having the foregoing construction, providing a power source for said first and second units, between said other end of the first unit or said one end of the second unit and the third connection portion of said connection means.

DESCRIPTION OF THE PREFERRED EMBODIMENTS

For brevity of the description, common or similar portions are denoted by common or similar numerals or notations throughout the drawings.

Figure 1:
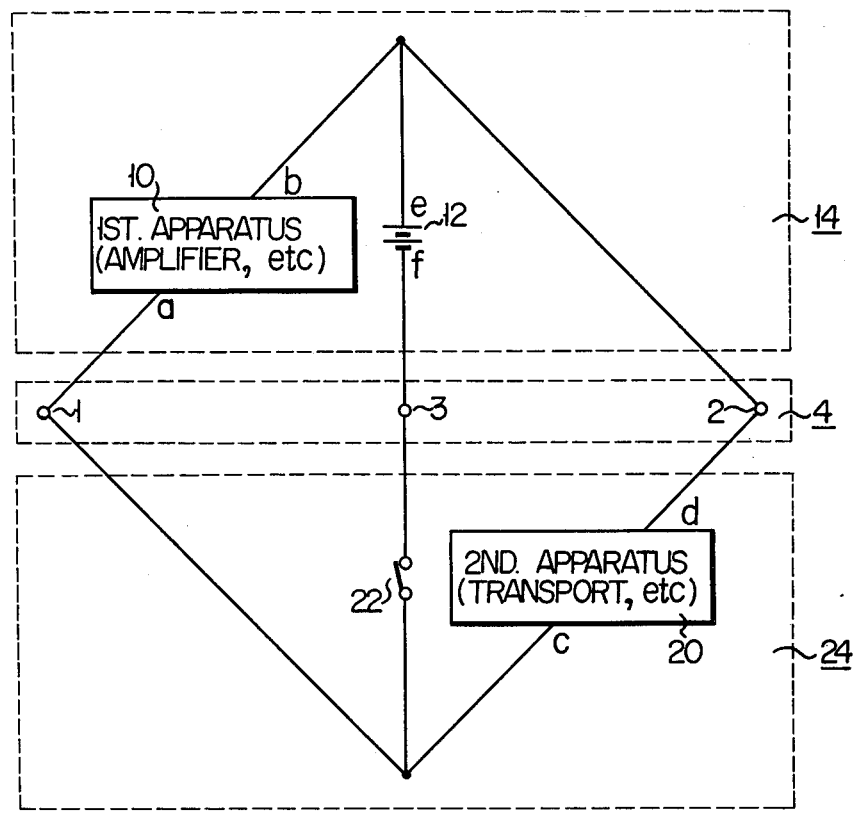
FIG. 1 is a circuit diagram illustrating a basic construction of the invention.

A connection device according to the invention has a connection means which includes three mutually independent electrical connection sections. Referring to FIG. 1, one end a of an amplifying unit (a first apparatus) 10 is connected via a first connection terminal 1 to one end c of a tape deck unit (a second apparatus) 20. The other end b of the amplifying unit 10 is connected via a second connection terminal 2 to the other end d of the deck unit 20. To said other end b of the amplifying unit 10 is connected a first terminal, e.g., a positive polarity terminal e of a power source 12. A second terminal or negative-polarity terminal f of the power source 12 is connected to said one end c of the deck unit 20 via a third connection terminal 3 and then via a power source switch 22. The amplifying unit 10 and the power source 12 are included in a body proper 14 of the connection device. The first to third connection terminals 1 to 3 constitute the connection means 4. The deck unit 20 and the power source switch 22 are included in a connection body 24.

When the body proper 14 is kept not coupled with the connection body 24, the negative-polarity terminal f of the power source 12 is not connected to any portion of the connection device. Accordingly, power is supplied neither to the amplifying unit 10 nor to the deck unit 20. When, on the other hand, the body proper 14 is coupled with the connection body 24 and the power switch 22 is turned on, power is supplied to each of the amplifying unit 10 and the deck unit 20. Supply of power to the amplifying unit 10 is effected via the first connection terminal 1 and via the third connection terminal 3, while supply of power to the deck unit 20 is effected via the second connection terminal 2 and via the third connection terminal 3. When the power source switch 22 is turned off, neither the amplifying unit 10 nor the deck unit 20 is given any power.

As stated above, in the connection device of the invention, when the body proper 14 is disconnected from the connection body 24, all power supply is automatically stopped. It is noteworthy that the advantage is realized by the connection means 4 including only three electrical contacts. That is to say, the present invention can be embodied with the device parts cost and the device-manufacturing steps the number which are much the same as those required for a conventional connection device.

Figure 2:
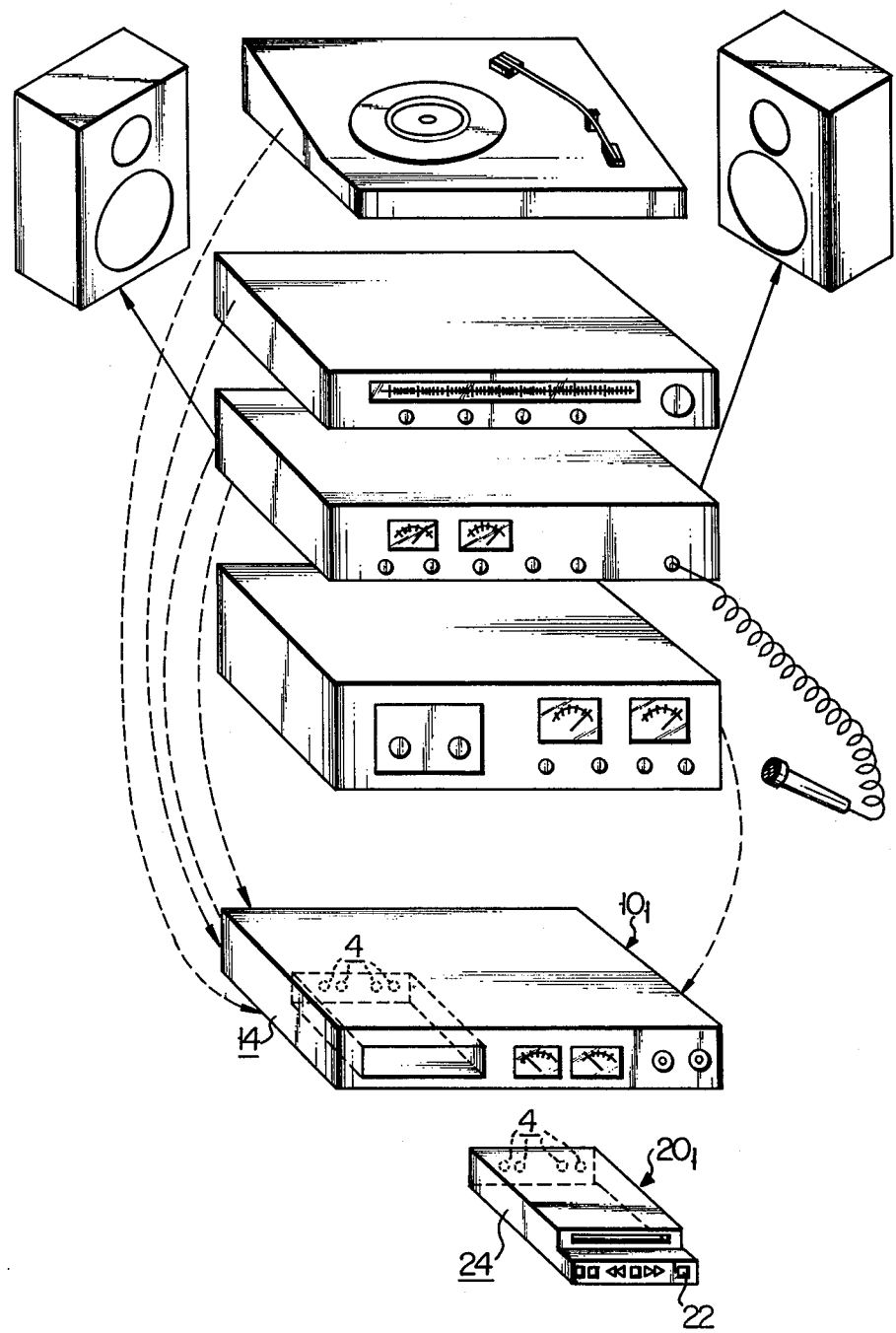
FIG. 2 is a perspective view illustrating an automobile magnetic tape playing apparatus as an applied example of the invention.

FIG. 2 shows an applied example of the connection device shown in FIG. 1. This Figure corresponds to FIG. 1 appearing in the above-mentioned U.S. application Ser. No. 49,960, filed June 8, 1979, now U.S. Pat. No. 4,369,478. The connection body 24 which is shown in FIG. 1 includes a tape transport or tape deck $20_1$, while the body proper 14 includes a recording/playing back amplifier $10_1$ and an auxiliary amplifier circuit, etc.

Figure 3:
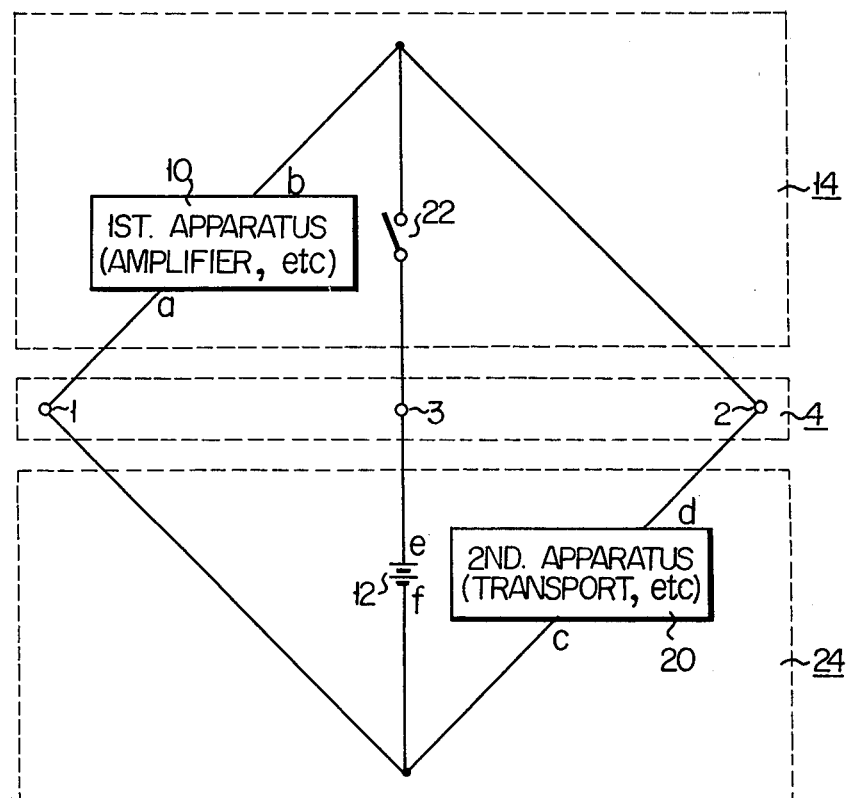
FIG. 3 is a circuit diagram illustrating a modification of the connection device shown in FIG. 1.

FIG. 3 shows a modification of FIG. 1. In the modified connection device of FIG. 3, the switch 22 is provided inside the body proper 14 while the power source 12 is provided inside the connection body 24.

Figure 4:
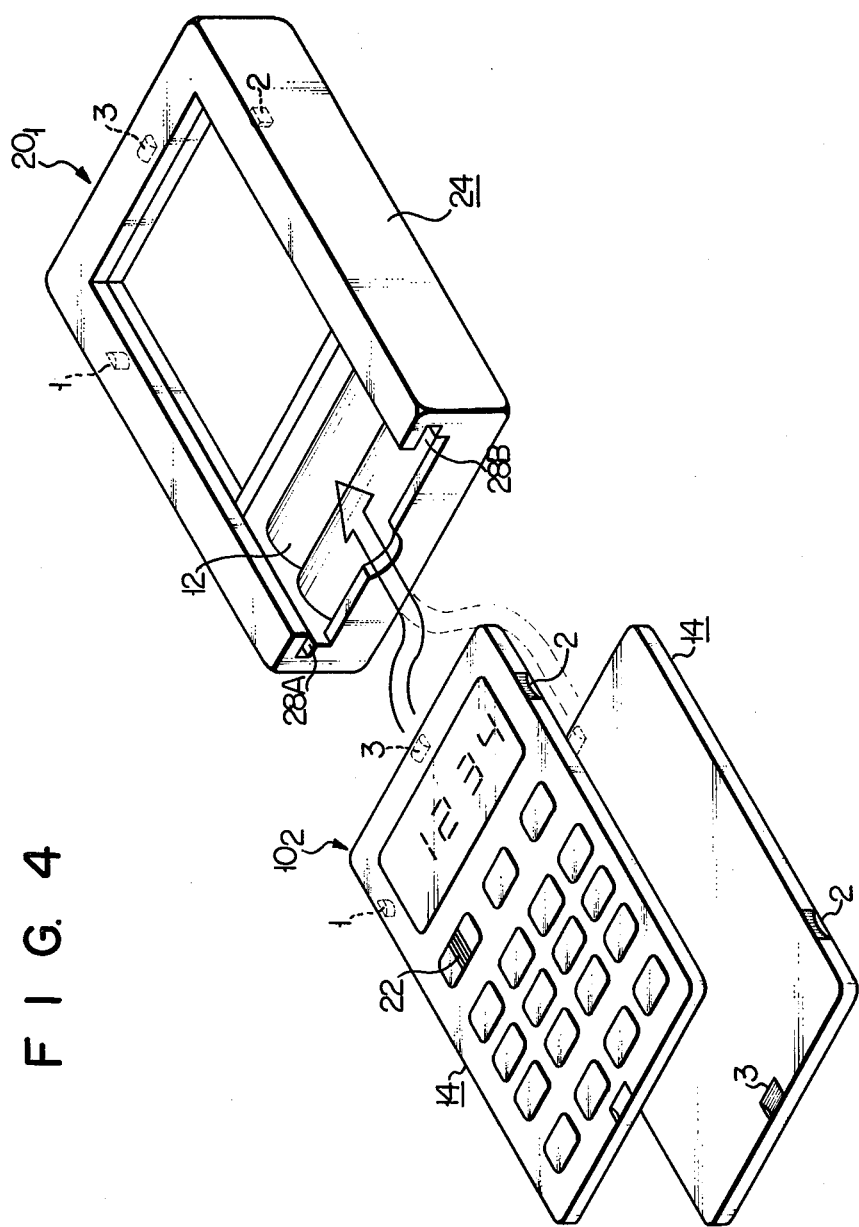
FIGS. 4 to 6 are perspective views illustrating other applied examples of the invention.
Figure 5:
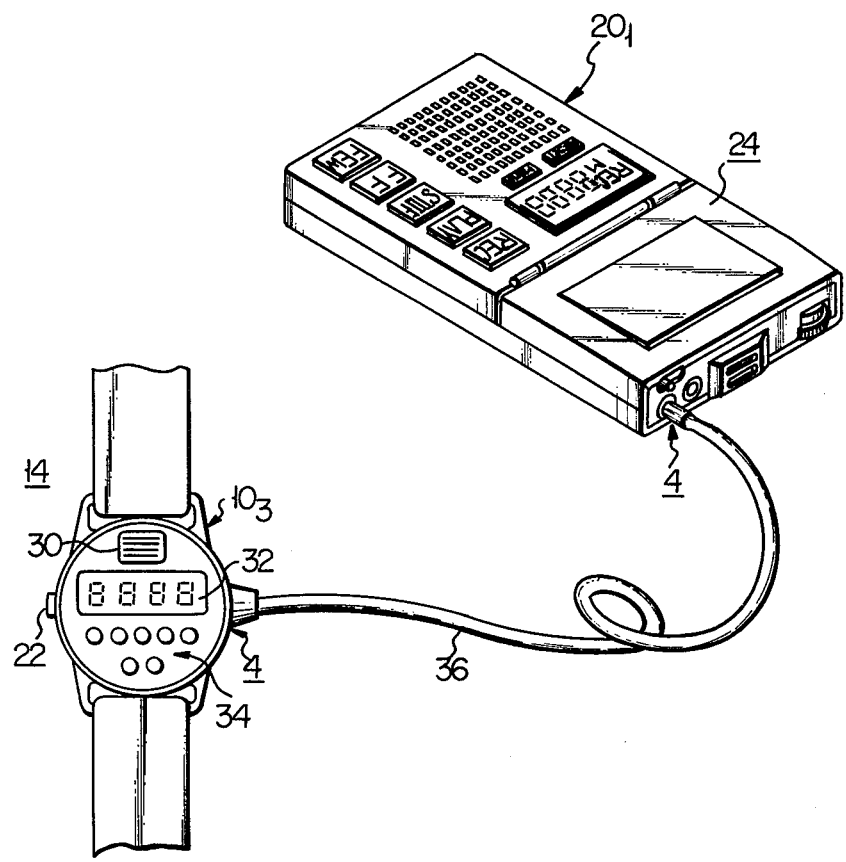
Figure 6:
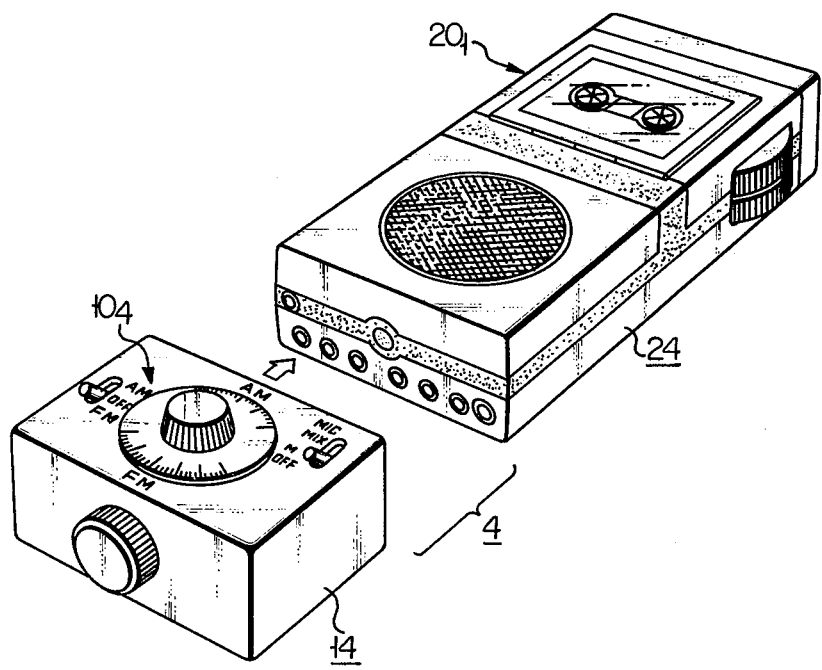

FIGS. 4 to 6 show other applied examples of the connection device according to the invention. In FIG. 4, a calculator $10_2$ is used to constitute the body proper 14 in connection with FIG. 1 or 2. Since, however, the terminologies "body proper" and "connection body" are used here in this description for the sake of convenience, such calculator may also be regarded as being the connection body, but will be termed hereinafter as the "body proper". In FIG. 4, the body proper 14 includes the calculator $10_2$. The body proper 14, if independent, is used as a calculator. The body proper 14 is fitted into guides 28A and 28B of the connection body 24 which includes a tape recorder $20_1$. The electrical connection between the body proper 14 and the connection body 24 is effected via contactors 1, 2 and 3 which constitute said connection means 4. If the contactors of the connection means 4 are provided in larger number, a keyboard of the calculator $10_2$ can be utilized as the logic control buttons for the tape recorder $20_1$ at the time when the body proper 14 is coupled to the connection body 24 with its front face pointing upwards as seen in FIG. 4. On the other hand, the body proper 14 becomes a back covering lid for the connection body 24 at the time when the former is fitted into the latter with its back face pointing upwards as alternately shown in FIG. 4.

In FIG. 5 is shown the connection device whose body proper 14 (which is, as stated before, merely so referred to for the sake of convenience) includes a wrist watch type remote control unit $10_3$. The body proper 14 comprises a microphone 30, time and tape counter display 32 and operation keys 34. A connection cable 36 includes wires for the first to third connection terminals 1 to 3 shown in FIG. 1 or 3, as well as connection wires for remote control. The connection means 4, therefore, has four or more contacts, for which reason it is a multi-connector.

The connection device shown in FIG. 6 is a disclosed in U.S. Pat. No. 4,041,250 which has been assigned to the same assignee as this application. It comprises a radio tuner $10_4$ as a component of the body proper 14. In this device, the connection means 4 of the invention is applied to a connection portion between the body proper 14 and the connection body including the tape recorder $20_1$.

Although specific constructions have been illustrated and described herein, it is not intended that the invention be limited to the elements and constructions disclosed. One skilled in the art will recognize that other particular elements or subconstructions may be used without departing from the scope and spirit of the invention.

What is claimed is:

1. A tape player apparatus for an automobile, comprising:
    (a) a main body (14) carried on the automobile, said main body (14) including a power source (12) having two power source terminals (e, f) and an amplifier unit (10) having two power receiving terminals (a, b) to which power is to be supplied from said power source (12);
    (b) a connection body (24) selectively connectable to and detachable from said main body (14), said connection body (24) including a tape transport unit (20) having two power receiving terminals (c, d) to which power is to be supplied from said power source (12) when said connection body (24) is connected to said main body (14);
    (c) means for detachably and mechanically mounting said connection body (24) in said main body (14); and
    (d) connection means (4) for coupling said main body (14) with said connection body (24), said connection means (4) including first, second and third connection portions (1, 2, 3) arranged such that when said connection body (24) is connected to said main body (14), said first connection portion (1) connects one terminal (a) of said amplifier unit (10) to one terminal (c) of said tape transport unit (20), said second connection portion (2) connects the other terminal (b) of said amplifier unit (10) to the other terminal (d) of said tape transport unit (20), and said third connection portion (3) connects said one terminal (c) of said tape transport unit (20) to a power source terminal (f) of said power source (12), the other power source terminal (e) of said power source (12) being connected to said other terminal (b) of said amplifier unit (10);
    whereby when said connection body (24) is disconnected from said main body (14), said connection means (4) is disconnected so as to disconnect said power source (12) from both said amplifier and tape transport units (10, 20);
    said main body (14) having no switch circuit means therein which would allow said power source (12) to be electrically connected to said amplifier unit (10) when said connection body (24) is detached from said main body (14), thereby preventing drain of said power source (12) when said connection body (24) is detached from said main body (14).

2. A connection device according to claim 1, further comprising: manually operable on-off switch means coupled between said third connection portion of said connection means and said one terminal of said tape transport unit such that during the connection of said main body with said connection body via said connection means, supply of power from said power source to said amplifier unit and to said tape transport unit can be selectively turned on and off by manual operation of said on-off switch means, said on-off switch means being inoperable to supply power from said power source to at least said amplifier unit when said connection body is detached from said main body.

3. A connection device according to claim 1 or 2, wherein said amplifier unit operates in cooperation with said tape transport unit when said connection body and main body are coupled together by means of said connection means.

4. A connection device according to claim 1 or 2, wherein said main body further comprises a remote control unit for controlling operation of said tape transport unit when said main body and connection body are coupled together by means of said connection means, said remote control unit being inoperable to supply power from said power source to at least said amplifier unit when said connection body is detached from said main body.

5. A connection device according to claim 1 or 2, wherein said main body further comprises a radio tuner which operates in cooperation with said tape transport unit of said connection body.

6. A connection device according to claim 1 or 2, wherein said first, second and third connection portions of said connection means comprise respective pairs of mating electrical contacts, one of each of said pairs of mating electrical contacts being on said connection body and the other of said pairs of mating electrical contacts being on said main body, whereby when said connection body is coupled to said main body via said connection means, said respective pairs of electrical contacts are electrically connected.

7. A connection device according to claim 2, wherein said on-off switch means is provided in said connection body.

8. An electrical apparatus for an automobile, comprising:
  (a) a main body (14) carried on the automobile, said main body (14) including a power source (12) having two power source terminals (e, f) and a first circuit portion (10) having two power receiving terminals (a, b) to which power is to be supplied from said power source (12);
  (b) a connection body (24) selectively connectable to and detachable from said main body (14), said connection body (24) including a second circuit portion (20) having two power receiving terminals (c, d) to which power is to be supplied from said power source (12) when said connection body (24) is connected to said main body (14);
  (c) means for detachably and mechanically mounting said connection body (24) in said main body (14); and
  (d) connection means (4) for coupling said main body (14) with said connection body (24), said connection means (4) including first, second and third connection portions (1, 2, 3) arranged such that when said connection body (24) is connected to said main body (14), said first connection portion (1) connects one terminal (a) of said first circuit portion (10) to one terminal (c) of said second circuit portion (20), said second connection portion (2) connects the other terminal (b) of said first circuit portion (10) to the other terminal (d) of said second circuit portion (20), and said third connection portion (3) connects said one terminal (c) of said second circuit portion (20) to a power source terminal (f) of said power source (12), the other power source terminal (e) of said power source (12) being connected to said other terminal (b) of said first circuit portion (10);
  whereby when said connection body (24) is disconnected from said main body (14), said connection means (4) is disconnected so as to disconnect said power source (12) from both said first and second circuit portions (10, 20);
  said main body (14) having no switch circuit means therein which would allow said power source (12) to be electrically connected to said first circuit portion (10) when said connection body (24) is detached from said main body (14), thereby preventing drain of said power source (12) when said connection body (24) is detached from said main body (14).

9. The electrical apparatus according to claim 8, further comprising: manually operable on-off switch means coupled between said third connection portion of said connection means and said one terminal of said second circuit portion such that during the connection of said main body with said connection body via said connection means, supply of power from said power source to said first circuit portion and to said second circuit portion can be selectively turned on and off by manual operation of said on-off switch means, said on-off switch means being inoperable to supply power from said power source to at least said first circuit portion when said connection body is detached from said main body.

10. The electrical apparatus according to claim 8 or 9, wherein said first circuit portion operates in cooperation with said second circuit portion when said connection body and main body are coupled together by means of said connection means.

11. The electrical apparatus according to claim 8 or 9, wherein said main body further comprises a remote control unit for controlling operation of said second circuit portion when said main body and connection body are coupled together by means of said connection means, said remote control unit being inoperable to supply power from said power source to at least said first circuit portion when said connection body is detached from said main body.

12. The electrical apparatus according to claim 8 or 9, wherein said first, second and third connection portions of said connection means comprise respective pairs of mating electrical contacts, one of each of said pairs of mating electrical contacts being on said connection body and the other of said pairs of mating electrical contacts being on said main body, whereby when said connection body is coupled to said main body via said connection means, said respective pairs of electrical contacts are electrically connected.

* * * * *